US010914193B2

(12) United States Patent
Lefebvre et al.

(10) Patent No.: US 10,914,193 B2
(45) Date of Patent: Feb. 9, 2021

(54) MULTIPLE SPOKE COOLING SYSTEM AND METHOD

(71) Applicant: Pratt & Whitney Canada Corp., Longueuil (CA)

(72) Inventors: Guy Lefebvre, St-Bruno-de-Montarville (CA); Remy Synnott, St-Jean-sur-Richelieu (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 847 days.

(21) Appl. No.: 15/209,065

(22) Filed: Jul. 13, 2016

(65) Prior Publication Data
US 2017/0114666 A1   Apr. 27, 2017

Related U.S. Application Data

(60) Provisional application No. 62/196,380, filed on Jul. 24, 2015, provisional application No. 62/196,500, (Continued)

(51) Int. Cl.
| | |
|---|---|
| *F01D 25/14* | (2006.01) |
| *F01D 9/06* | (2006.01) |
| *F01D 25/12* | (2006.01) |
| *F01D 25/16* | (2006.01) |
| *F02C 7/18* | (2006.01) |

(52) U.S. Cl.
CPC ............. *F01D 25/14* (2013.01); *F01D 9/065* (2013.01); *F01D 25/12* (2013.01); *F01D 25/125* (2013.01); *F01D 25/162* (2013.01); *F02C 7/18* (2013.01); *F05D 2220/32* (2013.01); *F05D 2240/50* (2013.01); *F05D 2240/60* (2013.01);
(Continued)

(58) Field of Classification Search
CPC ........ F01D 25/12; F01D 25/125; F01D 25/14; F01D 25/145; F01D 9/065
See application file for complete search history.

(56) References Cited

U.S. PATENT DOCUMENTS

| | | | |
|---|---|---|---|
| 3,261,587 A | 7/1966 | Rowley | |
| 3,403,889 A | 10/1968 | Ciokajlo | |

(Continued)

FOREIGN PATENT DOCUMENTS

| | | |
|---|---|---|
| CN | 101743391 | 6/2010 |
| CN | 102678334 | 9/2012 |

(Continued)

OTHER PUBLICATIONS

International Search Report for PCT application No. PCT/CA2016/050817 dated Sep. 12, 2016.
(Continued)

*Primary Examiner* — Ninh H. Nguyen
*Assistant Examiner* — Aye S Htay
(74) *Attorney, Agent, or Firm* — Norton Rose Fulbright Canada LLP (57) ABSTRACT

A mid-turbine frame module comprises an outer structural ring, an inner structural ring and a plurality of circumferentially spaced-apart spokes structurally interconnecting the inner structural ring to the outer structural ring. The spokes are used as air feed pipe to provide cooling to different engine systems, such as an oil scupper line and a disc cavity of an adjacent turbine disc.

17 Claims, 6 Drawing Sheets

Related U.S. Application Data filed on Jul. 24, 2015, provisional application No. 62/196,368, filed on Jul. 24, 2015.

(52) U.S. Cl.
CPC .... *F05D 2260/20* (2013.01); *F05D 2260/232* (2013.01); *F05D 2300/00* (2013.01)

(56) References Cited

U.S. PATENT DOCUMENTS

| | | |
|---|---|---|
| 3,451,456 A | 6/1969 | Dey |
| 3,543,588 A | 12/1970 | Richardson |
| 4,050,494 A | 9/1977 | de Claire |
| 4,183,207 A | 1/1980 | Libertini |
| 4,214,851 A | 7/1980 | Tuley et al. |
| 4,321,007 A | 3/1982 | Dennison et al. |
| 4,369,016 A | 1/1983 | Dennison |
| 4,571,936 A | 2/1986 | Nash et al. |
| 4,735,536 A | 4/1988 | Duran |
| 4,747,738 A | 5/1988 | Duran |
| 4,793,770 A | 12/1988 | Schonewald et al. |
| 4,815,908 A | 3/1989 | Duran et al. |
| 4,820,117 A | 4/1989 | Larrabee et al. |
| 4,836,708 A | 6/1989 | Chambers et al. |
| 4,943,013 A | 7/1990 | Kapala et al. |
| 4,948,316 A | 8/1990 | Duran et al. |
| 4,979,872 A | 12/1990 | Myers et al. |
| 4,987,736 A | 1/1991 | Ciokajlo et al. |
| 5,076,049 A | 12/1991 | Von Benken et al. |
| 5,080,555 A | 1/1992 | Kempinger |
| 5,160,251 A | 11/1992 | Ciokajlo |
| 5,180,282 A | 1/1993 | Lenhart et al. |
| 5,236,303 A | 8/1993 | Fowler et al. |
| 5,272,869 A | 12/1993 | Dawson et al. |
| 5,292,227 A | 3/1994 | Czachor et al. |
| 5,357,744 A | 10/1994 | Czachor |
| 5,438,756 A | 8/1995 | Halchak et al. |
| 5,456,719 A | 10/1995 | Keller |
| 5,517,817 A * | 5/1996 | Hines .................. F01D 17/162 415/115 |
| 5,634,767 A | 6/1997 | Dawson |
| 5,746,574 A | 5/1998 | Czachor et al. |
| 5,941,683 A | 8/1999 | Ridyard et al. |
| 6,250,840 B1 | 6/2001 | Urbach et al. |
| 6,290,442 B1 | 9/2001 | Peterkort |
| 6,358,001 B1 | 3/2002 | Bosel et al. |
| 6,439,616 B1 | 8/2002 | Karafillis et al. |
| 6,439,841 B1 | 8/2002 | Bosel |
| 6,547,518 B1 | 4/2003 | Czachor et al. |
| 6,619,030 B1 | 9/2003 | Seda et al. |
| 6,860,716 B2 | 3/2005 | Czachor et al. |
| 6,883,303 B1 | 4/2005 | Seda |
| 6,889,939 B2 | 5/2005 | Rouyre et al. |
| 7,055,305 B2 * | 6/2006 | Baxter .................. F01D 25/145 415/115 |
| 7,063,505 B2 | 6/2006 | Czachor |
| 7,195,447 B2 | 3/2007 | Moniz et al. |
| 7,220,119 B1 | 5/2007 | Kirchmer et al. |
| 7,273,345 B2 * | 9/2007 | Birrell .................... F01D 25/14 415/1 |
| 7,419,121 B2 | 9/2008 | Williams |
| 7,584,621 B2 | 9/2009 | Spitzer et al. |
| 7,594,404 B2 | 9/2009 | Somanath et al. |
| 7,597,537 B2 | 10/2009 | Bucaro et al. |
| 7,610,763 B2 | 11/2009 | Somanath et al. |
| 7,748,209 B1 | 7/2010 | Schopf et al. |
| 7,775,049 B2 | 8/2010 | Kumar et al. |
| 8,001,791 B2 | 8/2011 | Somanath et al. |
| 8,061,969 B2 | 11/2011 | Durocher et al. |
| 8,091,371 B2 | 1/2012 | Durocher et al. |
| 8,099,962 B2 | 1/2012 | Durocher et al. |
| 8,113,768 B2 | 2/2012 | Somanath et al. |
| 8,181,466 B2 | 5/2012 | Kumar et al. |
| 8,215,901 B2 | 7/2012 | Kapustka |
| 8,245,518 B2 | 8/2012 | Durocher et al. |
| 8,347,500 B2 | 1/2013 | Durocher et al. |
| 8,347,635 B2 | 1/2013 | Durocher et al. |
| 8,371,127 B2 | 2/2013 | Durocher et al. |
| 8,371,812 B2 | 2/2013 | Manteiga et al. |
| 8,388,306 B2 | 3/2013 | Somanath et al. |
| 8,500,392 B2 | 8/2013 | Durocher et al. |
| 8,550,773 B2 | 10/2013 | Almstedt et al. |
| 8,578,584 B2 | 11/2013 | Durocher et al. |
| 8,579,583 B2 | 11/2013 | Bock |
| 8,616,835 B2 | 12/2013 | Hashimoto |
| 8,740,550 B2 | 6/2014 | Tanioka |
| 8,827,255 B2 | 9/2014 | Woods |
| 8,863,531 B2 * | 10/2014 | Scott ..................... F02C 7/18 415/115 |
| 8,876,463 B2 | 11/2014 | Durocher et al. |
| 8,882,384 B2 | 11/2014 | Bynum |
| 8,888,427 B2 | 11/2014 | Ruppert et al. |
| 8,920,109 B2 | 12/2014 | Tham et al. |
| 8,944,749 B2 | 2/2015 | Durocher et al. |
| 8,992,173 B2 | 3/2015 | Farah et al. |
| 9,011,060 B2 | 4/2015 | Hyatt |
| 9,091,171 B2 * | 7/2015 | Rodriguez ............. F01D 9/065 |
| 9,097,138 B2 | 8/2015 | Glahn et al. |
| 9,097,141 B2 | 8/2015 | Paradis |
| 9,140,137 B2 | 9/2015 | Mayer et al. |
| 9,145,908 B2 | 9/2015 | Gill et al. |
| 9,151,316 B2 | 10/2015 | Smith et al. |
| 9,157,325 B2 | 10/2015 | Suciu et al. |
| 9,194,252 B2 | 11/2015 | Farah et al. |
| 9,200,536 B2 | 12/2015 | McCaffrey |
| 9,217,371 B2 | 12/2015 | Farah et al. |
| 9,222,413 B2 | 12/2015 | Farah et al. |
| 9,279,341 B2 | 3/2016 | Durocher et al. |
| 9,303,528 B2 | 4/2016 | Sanchez et al. |
| 9,316,117 B2 | 4/2016 | Sanchez et al. |
| 9,316,153 B2 | 4/2016 | Patat et al. |
| 9,328,629 B2 | 5/2016 | Scott et al. |
| 9,347,374 B2 | 5/2016 | Suciu et al. |
| 9,382,844 B2 | 7/2016 | Muldoon et al. |
| 9,387,905 B2 | 7/2016 | Chonan |
| 9,399,520 B2 | 7/2016 | Cassagne et al. |
| 9,410,596 B2 | 8/2016 | Young et al. |
| 9,447,694 B2 | 9/2016 | Sanchez et al. |
| 9,458,721 B2 | 10/2016 | Palmer |
| 9,476,443 B2 | 10/2016 | Stoner |
| 9,482,115 B2 | 11/2016 | Harris et al. |
| 9,869,204 B2 * | 1/2018 | Winn .................... F01D 25/145 |
| 2007/0196196 A1 | 8/2007 | Schorling et al. |
| 2010/0132370 A1 | 6/2010 | Durocher |
| 2010/0132371 A1 | 6/2010 | Durocher et al. |
| 2010/0132372 A1 | 6/2010 | Durocher et al. |
| 2010/0132376 A1 | 6/2010 | Durocher |
| 2010/0275572 A1 * | 11/2010 | Durocher ............... F01D 9/065 60/39.08 |
| 2010/0303610 A1 | 12/2010 | Wang et al. |
| 2012/0227371 A1 * | 9/2012 | Johnson ................. F01D 9/065 60/39.83 |
| 2013/0052006 A1 | 2/2013 | Petty |
| 2013/0064647 A1 | 3/2013 | Hashimoto |
| 2013/0094951 A1 | 4/2013 | McCaffrey |
| 2013/0192238 A1 | 8/2013 | Munsell et al. |
| 2013/0192256 A1 | 8/2013 | Suciu et al. |
| 2013/0192267 A1 | 8/2013 | Sanchez et al. |
| 2013/0195624 A1 | 8/2013 | Schwarz et al. |
| 2014/0003920 A1 | 1/2014 | Scott |
| 2014/0007588 A1 | 1/2014 | Sanchez et al. |
| 2014/0013770 A1 | 1/2014 | Farah |
| 2014/0013771 A1 | 1/2014 | Farah et al. |
| 2014/0102110 A1 | 4/2014 | Farah et al. |
| 2014/0137534 A1 | 5/2014 | Sanchez et al. |
| 2014/0205447 A1 * | 7/2014 | Patat ..................... F01D 9/065 415/177 |
| 2014/0227078 A1 | 8/2014 | Chokshi |
| 2014/0255174 A1 | 9/2014 | Duelm et al. |
| 2014/0271152 A1 * | 9/2014 | Rodriguez ............. F01D 21/12 415/177 |
| 2015/0044032 A1 | 2/2015 | Paradis et al. |
| 2015/0064000 A1 | 3/2015 | Yagi |
| 2015/0125291 A1 | 5/2015 | Chokshi |

(56) References Cited

U.S. PATENT DOCUMENTS

| | | |
|---|---|---|
| 2015/0192034 A1 | 7/2015 | Bedard et al. |
| 2015/0192165 A1 | 7/2015 | Bauer et al. |
| 2015/0192167 A1 | 7/2015 | Harris et al. |
| 2015/0233295 A1* | 8/2015 | Farah ................. F02C 7/18 60/772 |
| 2015/0260057 A1 | 9/2015 | Farah et al. |
| 2015/0330250 A1* | 11/2015 | Scott ................. F01D 9/065 415/177 |
| 2015/0337681 A1 | 11/2015 | Scott et al. |
| 2015/0338005 A1 | 11/2015 | Davis et al. |
| 2015/0345337 A1 | 12/2015 | Petty et al. |
| 2015/0345338 A1 | 12/2015 | Yeager et al. |
| 2015/0354411 A1 | 12/2015 | Scott |
| 2016/0017754 A1 | 1/2016 | Kumar |
| 2016/0017807 A1 | 1/2016 | Chuong |
| 2016/0024949 A1 | 1/2016 | Wilber |
| 2016/0032775 A1 | 2/2016 | Wang |
| 2016/0107276 A1 | 4/2016 | Gekht et al. |
| 2016/0146101 A1 | 5/2016 | Lee |
| 2016/0153315 A1 | 6/2016 | Kapustka et al. |
| 2016/0169050 A1 | 6/2016 | Scott et al. |
| 2016/0186614 A1 | 6/2016 | Paulino |
| 2016/0201512 A1 | 7/2016 | Bauer et al. |
| 2016/0201516 A1 | 7/2016 | Bauer et al. |
| 2016/0208644 A1 | 7/2016 | Burdick et al. |
| 2016/0208646 A1 | 7/2016 | Winn et al. |
| 2016/0208647 A1 | 7/2016 | Cherolis et al. |
| 2016/0208648 A1 | 7/2016 | Farah |
| 2016/0208655 A1 | 7/2016 | Farah et al. |
| 2016/0208699 A1 | 7/2016 | Cherolis et al. |
| 2016/0208701 A1 | 7/2016 | Cherolis et al. |
| 2016/0222827 A1 | 8/2016 | Winn et al. |
| 2016/0230598 A1 | 8/2016 | Cherolis et al. |
| 2016/0230602 A1 | 8/2016 | Broulidakis et al. |
| 2016/0230603 A1 | 8/2016 | Broulidakis et al. |
| 2016/0245105 A1 | 8/2016 | Farah et al. |
| 2016/0245114 A1 | 8/2016 | Wang |
| 2016/0265439 A1 | 9/2016 | Winn et al. |
| 2016/0273383 A1 | 9/2016 | Cherolis et al. |
| 2016/0273384 A1 | 9/2016 | Winn et al. |
| 2016/0290166 A1 | 10/2016 | Max et al. |
| 2016/0290167 A1 | 10/2016 | Porter et al. |
| 2016/0312659 A1 | 10/2016 | Lienau et al. |
| 2016/0326910 A1 | 11/2016 | Socha et al. |
| 2016/0333739 A1 | 11/2016 | Vo et al. |

FOREIGN PATENT DOCUMENTS

| | | |
|---|---|---|
| CN | 102893162 | 1/2013 |
| CN | 103306818 | 9/2013 |
| CN | 103982465 A | 8/2014 |
| CN | 203778897 U | 8/2014 |
| CN | 104093553 | 10/2014 |
| CN | 105805143 A | 7/2016 |
| CN | 106958467 | 7/2017 |
| DE | 3233976 C1 | 8/1983 |
| EP | 1936210 A1 | 6/2008 |
| EP | 2192271 B1 | 9/2014 |
| EP | 2192273 B1 | 9/2014 |
| FR | 2786230 A1 | 5/2000 |
| GB | 898164 A | 6/1962 |
| GB | 913407 A | 12/1962 |
| GB | 1193056 A | 5/1970 |
| GB | 1361994 A | 7/1974 |
| GB | 1411299 A | 10/1975 |
| GB | 2196083 A | 4/1988 |
| KR | 1216286 B1 | 12/2012 |
| KR | 1558493 B1 | 10/2015 |
| WO | WO2011134199 A1 | 11/2011 |
| WO | WO2014/105572 | 7/2014 |
| WO | WO2014113034 A1 | 7/2014 |
| WO | WO2014115187 A1 | 7/2014 |
| WO | WO2014137574 A1 | 9/2014 |
| WO | WO2015156882 A2 | 10/2015 |
| WO | WO2015157751 A1 | 10/2015 |

OTHER PUBLICATIONS

International Search Report for PCT application No. PCT/CA2016/050818 dated Aug. 25, 2016.

International Search Report for PCT application No. PCT/CA2016/050825 dated Sep. 19, 2016.

International Search Report for PCT application No. PCT/CA2016/050824 dated Sep. 28, 2016.

* cited by examiner

MULTIPLE SPOKE COOLING SYSTEM AND METHOD

CROSS REFERENCE TO RELATED APPLICATIONS

The present application claims priority on U.S. Provisional Patent Application No. 62/196,380 filed on Jul. 24, 2015, U.S. Provisional Patent Application No. 62/196,500 filed on Jul. 24, 2015 and U.S. Provisional Patent Application No. 62/196,368 filed on Jul. 24, 2015, the entire content of all the above applications is herein incorporated by reference.

TECHNICAL FIELD

The application relates generally to gas turbine engines and, more particularly, to a cooling arrangement for cooling the structural spokes of a mid-turbine frame module.

BACKGROUND OF THE ART

It is known to use structural spokes to transfer loads from a bearing casing to an outer structural ring of a gas turbine engine. For instance, such spokes may be found in mid-turbine frame modules. Each spoke typically extends radially from the outer ring through a strut in the gaspath to an inner ring supporting the bearing casing. During engine operation, the spokes all around the module must be maintained at substantially the same temperature in order to prevent the bearing from becoming off-centered as a result of differential thermal growth between the spokes. Also, service lines are typically disposed in different struts than the one accommodating the spoke and cooled via dedicated cooling circuits to avoid potential contamination.

SUMMARY

In one aspect, there is provided a mid-turbine frame module comprising an outer structural ring, an inner structural ring supporting a bearing, a plurality of circumferentially spaced-apart tubular spokes structurally interconnecting the inner structural ring to the outer structural ring, the spokes being connected in fluid flow communication with an air plenum and being used as air feed tubes.

In accordance with another aspect, a first portion of the spokes are used to direct purge air to a disc cavity of an adjacent turbine rotor.

In accordance with another aspect, the remaining spokes are used to feed/purge air and oil of a scupper line in the event of an oil seal failure.

In accordance with a still further general aspect, there is provided a mid-turbine frame module comprising an outer structural ring, an inner structural ring supporting a bearing, a plurality of circumferentially spaced-apart tubular spokes structurally interconnecting the inner structural ring to the outer structural ring, first and second air cooling circuits connected in fluid flow communication with an annular plenum disposed radially outwardly relative to a gaspath, the first cooling circuit extending radially inwardly through a first portion of the spokes to a chamber located radially inwardly of the gaspath and wherein the second circuit extends from the annular plenum radially inwardly of the gas path through a second portion of the spokes.

In accordance with another aspect, there is provided a mid-turbine frame for a gas turbine engine, the mid-turbine frame comprising: an outer structural ring, an inner structural ring, an annular gas path between the inner and outer structural ring, a plurality of circumferentially spaced-apart hollow struts extending radially through the gas path, a plurality of circumferentially spaced-apart tubular spokes respectively extending internally through the hollow struts and structurally interconnecting the inner structural ring to the outer structural ring, the tubular spokes defining coolant flow passages extending generally radially across the gas path, the tubular spokes arranged and fluidly connected in first and second groups respectively forming parallel first and second cooling circuits, wherein the first cooling circuit is in fluid flow communication with a disc cavity of a turbine disc and the second cooling circuit is in fluid flow communication with an oil scupper line.

In accordance with a further aspect, there is provided a mid-turbine frame module for a gas turbine engine, the module comprising: an outer structural ring, an inner structural ring, an annular gas path between the inner and outer structural ring, a plurality of circumferentially spaced-apart hollow struts extending radially through the gas path, a plurality of circumferentially spaced-apart tubular spokes extending internally through respective ones of the hollow struts for structurally interconnecting the inner structural ring to the outer structural ring, each of the tubular spokes defining a coolant flow passage extending radially through the gas path, the tubular spokes comprising first and second groups of tubular spokes respectively forming part of first and second separate cooling circuits, wherein the coolant flow passages of the first group of the tubular spokes are connected in fluid flow communication to a disc cavity of an adjacent turbine disc, and wherein the coolant flow passages of the second group of the tubular spokes are connected in fluid flow communication with an oil scupper line.

In accordance with a still further general aspect, there is provided a spoke cooling arrangement for a gas turbine engine mid-turbine frame module comprising: a plurality of circumferentially spaced-apart tubular spokes structurally interconnecting an inner structural ring to an outer structural ring, the spoke cooling arrangement comprising: first and second separate cooling circuits connected to a common coolant source, the first cooling circuit including a first group of the tubular spokes arranged in parallel fluid flow relationship and fluidly linking the source of coolant to a disc cavity of an adjacent turbine disc, the second cooling circuit including a second group of the tubular spokes arranged in serial fluid flow relationship and fluidly linking the source of coolant to an oil scupper line.

DESCRIPTION OF THE DRAWINGS

Reference is now made to the accompanying figures in which:

FIG. 6b is an enlarged view of a radially inner end portion of the spoke cooling flow scheme shown in FIG. 6a;

FIG. 6c is an enlarged view of a radially outer end portion of the spoke cooling flow scheme shown in FIG. 6a;

DETAILED DESCRIPTION

Figure 1:
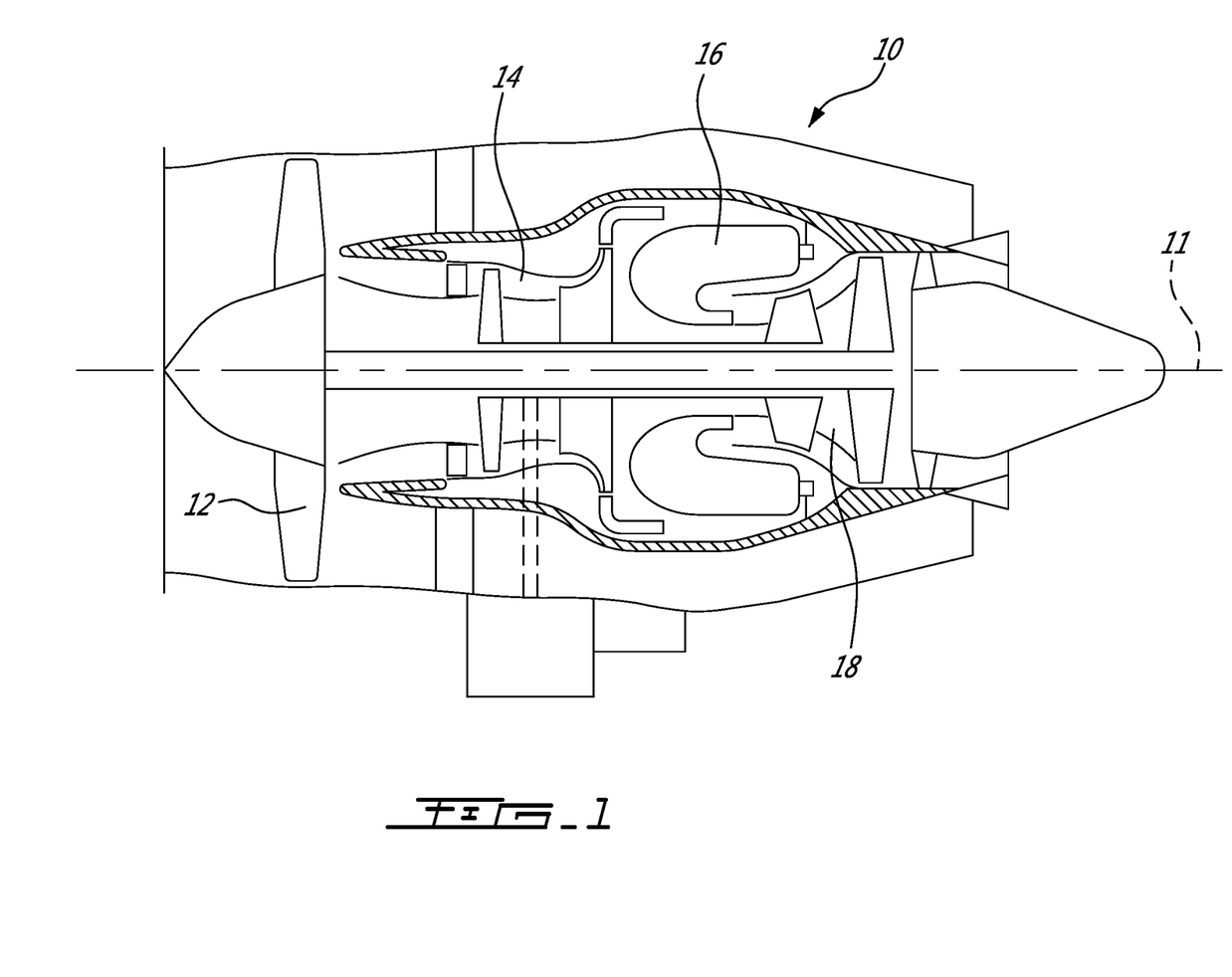
FIG. 1 is a schematic cross-section view of a gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
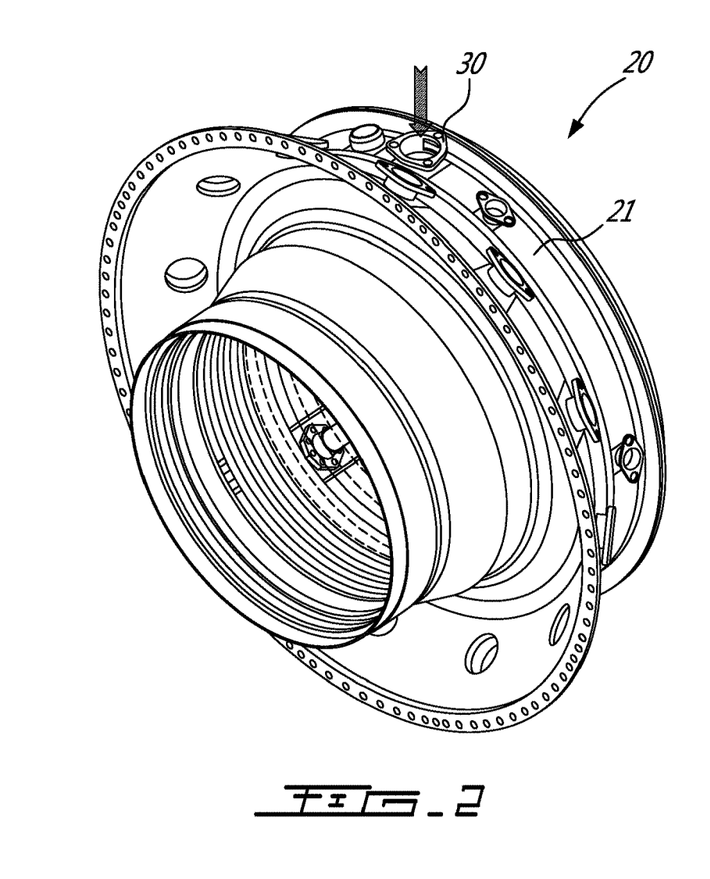
FIG. 2 is an isometric view of a mid-turbine frame module mounted in an engine outer case.
Figure 3:
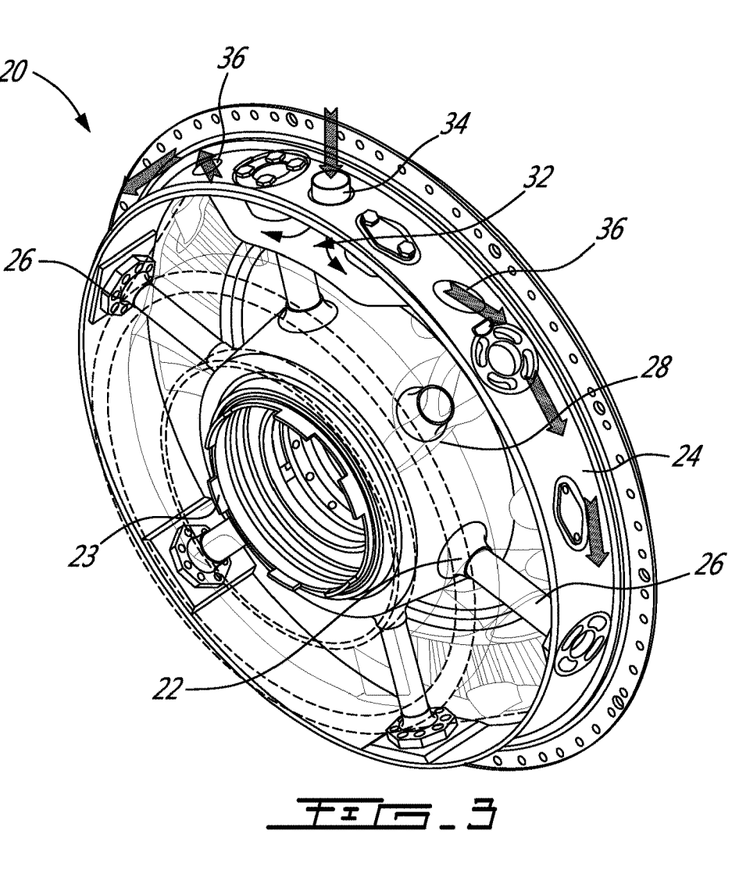
FIG. 3 is an isometric view of the mid-turbine frame shown without the engine outer case.

FIGS. 2 and 3 show a portion of the turbine section 18. More particularly, FIG. 2 illustrates a mid-turbine frame module 20 housed within an engine outer case 21. As shown in FIG. 3, the mid-turbine frame module 20 comprises an inner structural ring 22 adapted to receive and support a bearing casing 23, which is, in turn, adapted to support the main shafts of the engine 10. The bearing casing 23 may be detachably mounted to the inner ring 22 by means of bolts or the like.

The inner bearing support ring 22 is structurally supported by an outer structural ring 24 by means of a plurality of circumferentially distributed tubular spokes 26 (6 in the illustrated embodiment). In addition of transferring the loads from the inner ring 22 to the outer ring 24, the spokes 26 centralize the inner ring 22 and, thus, the bearing casing 23 relative to the outer ring 24. The term "tubular spoke" is herein intended to refer to generally refer to a hollow spoke structure and is, thus, not limited to any specific cross-sectional shape.

Each spoke 26 may extend radially through a hollow strut 29a, b (FIG. 6a) of a non-structural integrated strut-vane (ISV) casing 28 "floatingly" mounted between the inner and outer structural rings 22 and 24 for guiding the combustion gases between two axially adjacent turbine stages. The ISV casing 28 has a radially outer and a radially inner gaspath walls 28a, 28b (FIGS. 5 and 6a) defining therebetween a portion of the gaspath of the turbine section 18. According to the illustrated embodiment, the ISV casing 28 does not play a structural role. That is loads from the bearing casing 23 are not transmitted to the outer casing 24 via the ISV casing 28. The loads are rather transmitted through the spokes 26, which are shielded from the hot combustion gases by the hollow struts 29 of the ISV casing 28. In such an arrangement, the spokes can be referred to as cold spokes.

During engine operation, all the spokes 26 need to be kept at substantially the same temperature in order to prevent the bearing casing 23 from becoming off-centered. Indeed, if the spokes 26 have different thermal growths, the concentricity of the inner ring 22 relative to the outer ring 24 may be lost and consequently the bearing centralization compromised. Accordingly, there is a need for a way to uniformly distribute coolant to the spokes 26 all around the module 20 so that the temperature of all the spokes 26 is substantially the same. Moreover, when introducing coolant (e.g. compressor bleed air) in module 20, the coolant should be directed such as to avoid creating local cold spots on the outer ring 24, which could also affect the bearing centralization.

Figure 4:
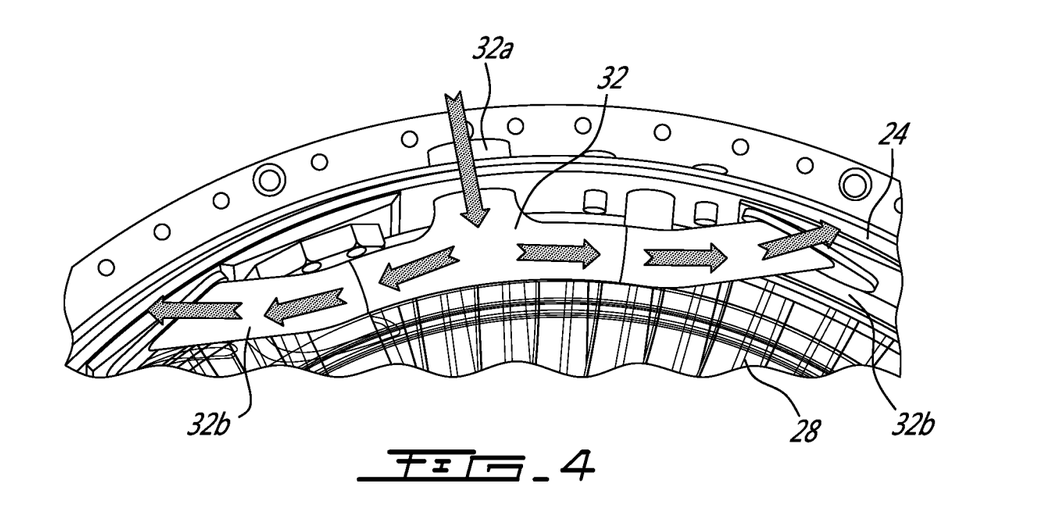
FIG. 4 is an enlarged view of a portion of the mid-turbine frame illustrating an air intake arrangement for uniformly distributing cooling air all around the module and avoid the formation of a local cold spot in the module.

According to one embodiment, a single external pipe (not shown) may be used to direct coolant, such as bleed air from the compressor of the engine 10, to the mid-turbine frame module 20. As shown in FIG. 2, a port 30 is provided on the engine outer case 21 for receiving cooling air from the external pipe. Cooling air from the engine outer case intake port 30 is then directed into an intake duct 32 mounted to the outer structural ring 24. According to the embodiment illustrated in FIG. 4, the intake duct 32 may be provided in the form of a generally T-shaped duct having an inlet branch 32a extending radially through a hole 34 defined in the outer ring 24 and a pair of outlet branches 32b extending laterally from opposed sides of the inlet branch 32a on a radially inner side of the outer ring 24. The outlet branches 32b generally extend in circumferentially opposite directions and have respective outlet ends connected to outlet ports 36 provided on the outer ring 24 on opposed sides of the hole 34. The intake duct 32 may be made in sheet metal, casting or any other suitable materials.

Figure 5:
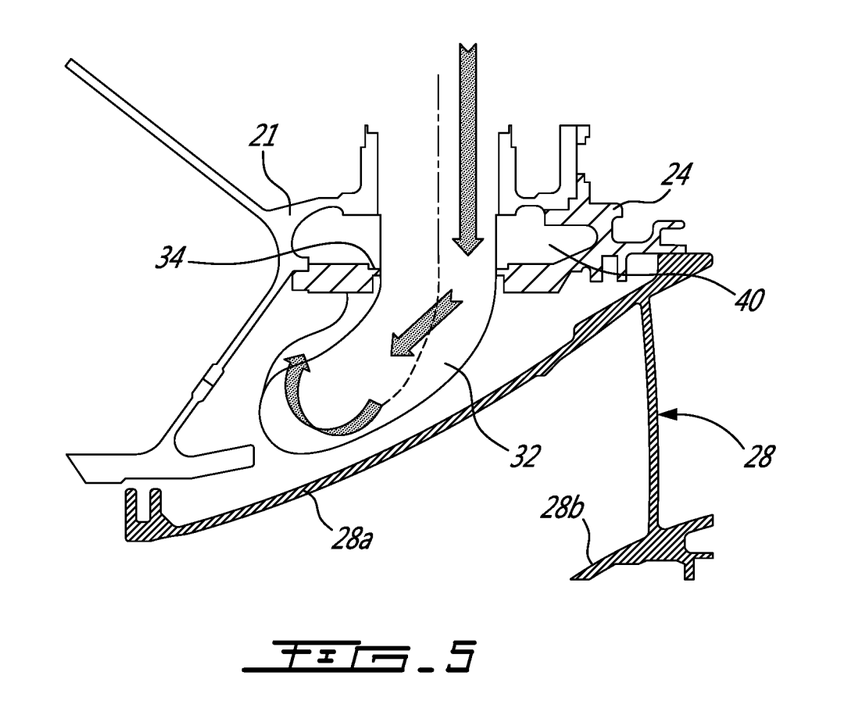
FIG. 5 is a cross-section view of the air intake arrangement shown in FIG. 4.

As shown in FIG. 5, the outlet branches 32b of the air intake duct discharge the cooling air in circumferentially opposed directions into an annular cavity 40 defined between the engine outer case 21 and the outer ring 24. The annular cavity 40 forms an air plenum all around the module. As shown in FIG. 3, the air plenum is in flow communication with the spokes and the hollow struts in which the spokes 26 are positioned. By building an air pressure in the annular air plenum, cooling air may be uniformly distributed to the spokes 26 all around the cavity 40. It provides for an internal core passage architecture that distributes the cooling air in a circumferential manner to avoid unequal metal temperature in the mid-turbine frame module outer ring structure. Also, it can be appreciated that the air intake duct 32 prevents the incoming cooling air to be locally discharged directly against the outer ring 24, thereby avoiding the creation of a local cold spot thereon adjacent one of the spokes 26. The air intake duct 32 rather splits the incoming flow of cooling air and redirects it with a radially outward and a circumferential component into the annular cavity 40 between the outer ring 24 and the engine outer case 21. The air impacts upon the engine outer case 21 and, thus, not on the outer ring 24, which is used to centralize the inner bearing casing 23 with the spokes 26. This contributes preserving the bearing centralization.

Also the above embodiment eliminates the use of multiple air cooling feed pipes, which may have a non-negligible impact on the overall weight of the engine. It also allows the introduction of cooling air in a restricted area. The air duct internal intake can also be easily replaced.

Figure 6A:
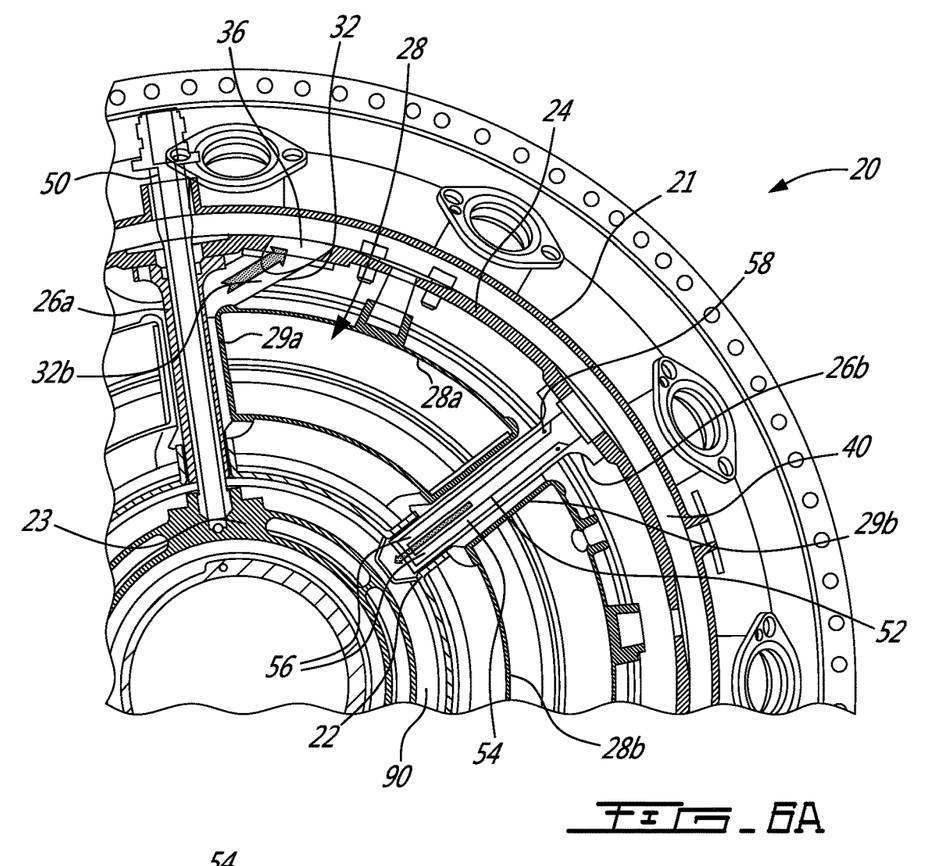
FIG. 6a is a cross-section view of a portion of the mid-turbine frame module illustrating a cooling flow scheme through one of the spokes.

According to an embodiment, six spokes are used to support and centralize the bearing casing 23. Two of the spokes 26 (one at the bottom and one at the top of the module) are also used to accommodate bearing housing service lines 50, such as oil tubes. FIG. 6a illustrates an example of a first hollow airfoil strut 29a containing a combined structural spoke 26a and bearing housing service line 50 and a second hollow airfoil strut 29b containing a structurally dedicated spoke 26b (spoke with no oil service lines). The two structural spokes 26a with their internal bearing service lines 50 and the four structurally dedicated spokes 26b must be kept at substantially the same temperature to ensure rotor centralization. This may be achieved by providing in each of the 4 structurally dedicated spokes with an internal architecture that mimics the air circulation through the 2 spokes accommodating the bearing service lines 50.

Figure 6B:
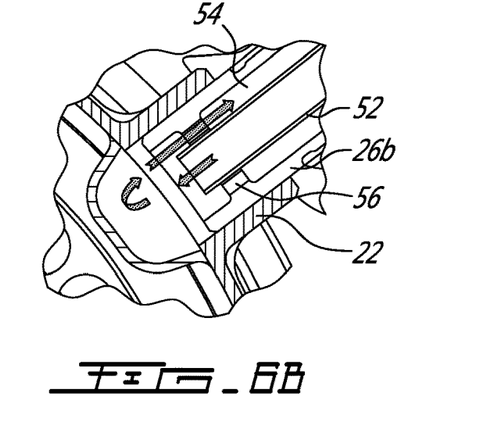
Figure 6C:
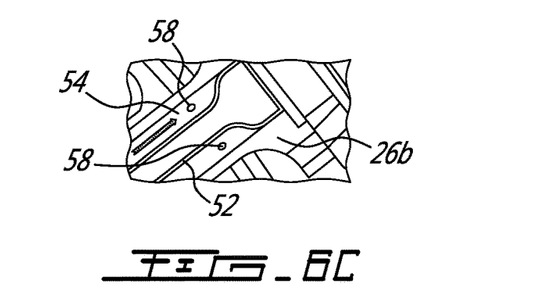

Referring concurrently to FIGS. 6a to 6c, it can be appreciated that a sleeve or tubular insert 52 may be provided in each of the 4 structurally dedicated spokes 26b to form an internal annular gap or annular reverse flow passage 54, which generally corresponds to the one between the combined spoke 26a and bearing housing service line 50 and associated surrounding strut 29a. Now referring concurrently to FIGS. 6a to 6c and 7a, it can be appreciated that a first cooling circuit is formed between the annular cavity 40 and the 4 structurally dedicated spokes 26b. The coolant flows from the annular cavity 40 radially inwardly through the internal main coolant flow passage defined by the tubular insert 52 mounted inside each of the structurally dedicated spokes 26b. As shown in FIG. 7b, the air discharged from the insert 52 of each spoke 26b is received in an annular chamber 80 defined between the inner ring 22 and the radially inner end of each spoke 26b. A first portion of this air is discharged through holes 82 in the inner ring 22 and then directed to purge the upstream disc cavity 93 of an adjacent turbine rotor 95. As best shown in FIG. 6b, the remaining portion of the cooling air discharged from each insert 52 is recirculated back through the spokes 26b in the annular reverse flow passage 54. Flows calibrating holes or other suitable flow calibration devices 56 are provided at the radially inner end of each spoke 26b to calibrate the flow of cooling air passing through each of the annular gaps 54. The holes 56 are calibrated so that the portion of the cooling air flowing radially outwardly through the annular gap 54 maintains the spokes 26b substantially at the same temperature as the top and bottom spokes 26a housing the internal bearing service lines 50. As shown in FIG. 6c, outlet holes 58 are defined in the radially outer end portion of the spokes 26b to discharge the cooling air between the ISV casing 28 and the outer ring 24. This flow path mimics the cooling flow path around the top and bottom spokes 26a (FIG. 7a) used for the oil tubes/bearing service lines 50. This configuration ensures that all the structural spokes 26 with and without bearing housing service lines are kept at the same temperature, thereby ensuring bearing housing centralization throughout the engine operating envelope. In the prior art, separate struts had to be used for the structural spokes and the bearing service lines. With the new proposed arrangement, a service line and a spoke can be positioned in a same hollow strut. This reduces the number of large, hollow struts in the gaspath. It allows the cold spoke design mid-turbine frame to be used in physically smaller engines. The uniformity of the cooling flow between the different types of spokes ensures bearing housing concentricity while allowing various hardware combinations to transverse the ISV gaspath combinations.

Figure 7A:
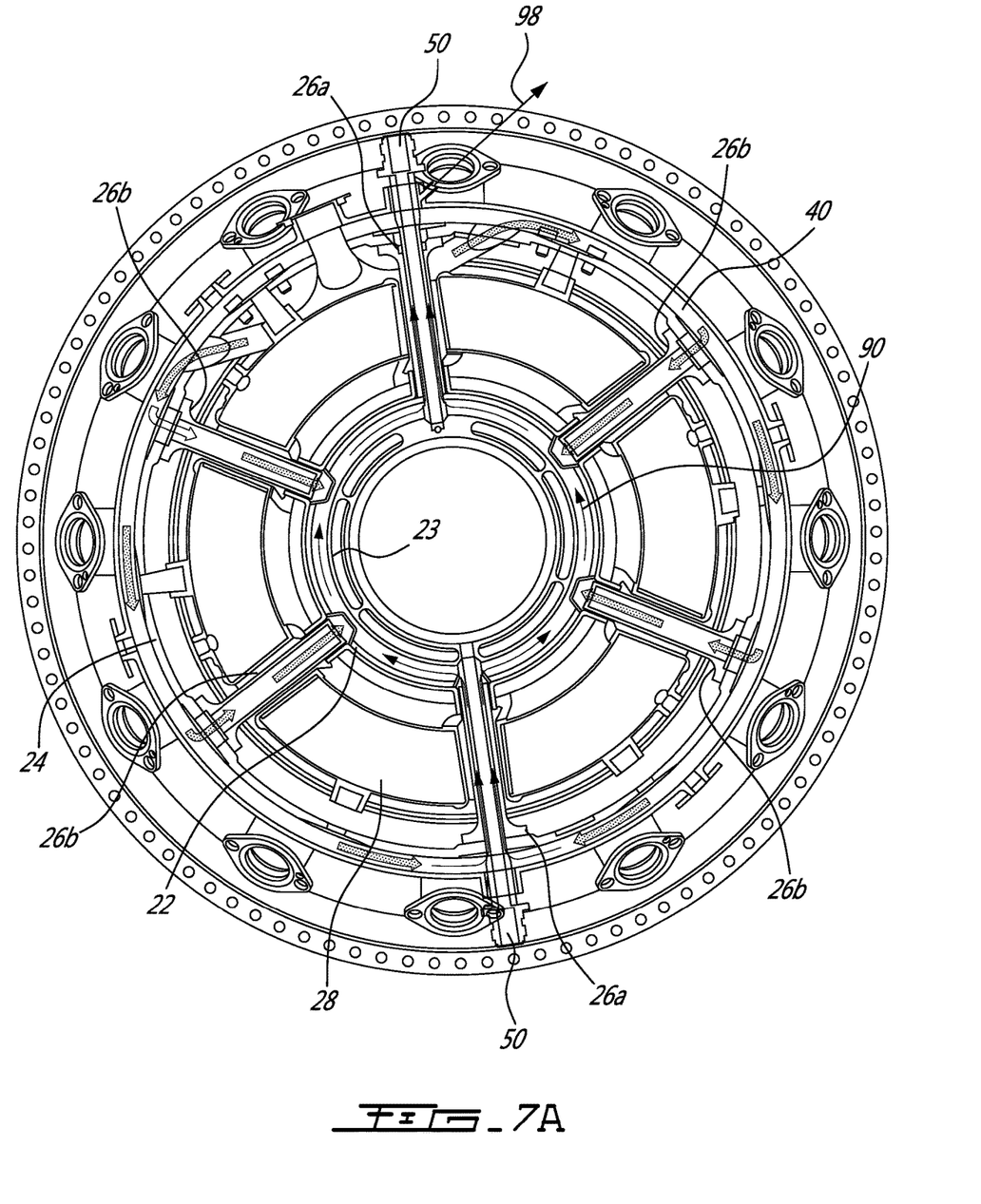
FIG. 7a is an end view of the mid-turbine frame module illustrating a first cooling circuit for structurally dedicated spokes, which do not accommodate any service lines, and a second cooling circuit for the top and bottom spokes, which integrate bearing housing service lines, the two circuits being separated to avoid air contamination.
Figure 7B:
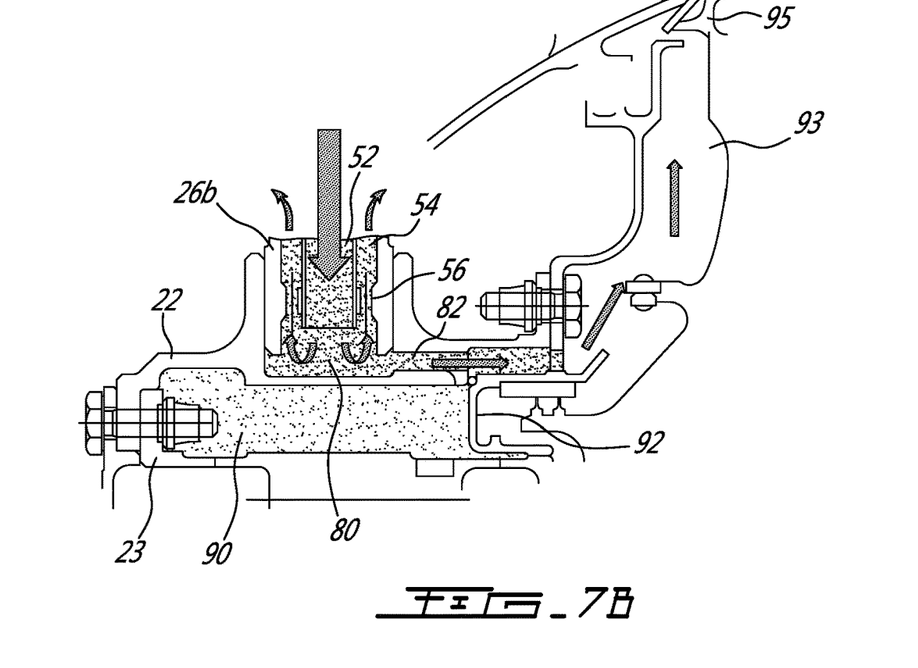
FIG. 7b is an enlarged cross-section view of a radially inner outlet end portion of the first cooling circuit.
Figure 7C:
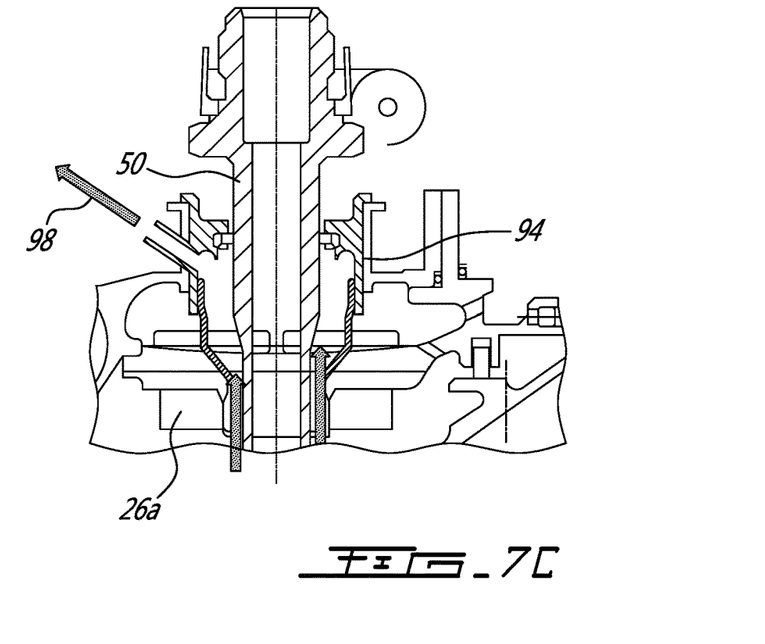
FIG. 7c is an enlarged cross-section view of a radially outer outlet end portion of the second cooling circuit.

Referring to FIGS. 7a and 7c, it can be appreciated that the cooling system comprises a second cooling circuit, which is separate from the first cooling circuit described above for the 4 structurally dedicated spokes 26b. The second cooling circuit provides cooling to the top and bottom spokes 26a housing the service lines 50. As can be appreciated from FIG. 7a, the annular gap between the bottom spoke 26a and the service line 50 extending therethrough is connected in fluid flow communication with the annular cavity or air plenum 40. The air is discharged from the bottom spoke 26a into a sealed annular chamber or cavity 90 defined between the inner ring 22, the bearing casing 23 and a rear cover 92 (FIG. 7b) bolted to the inner ring 22. The cooling air travels circumferentially through the annular cavity 90 from the bottom spoke 26a to the top spoke 26a. As shown in FIG. 7a, the cooling air exits the annular cavity 90 via the annular gap defined between the top spoke 26a and the service line 50 extending therethrough. As shown in FIG. 7c, the air is discharged at a radially outer end of the service line 50 through outlet holes 94. The person skilled in the art will appreciate that the top and bottom spokes 26a are used to feed/purge air and oil of a scupper line (schematically depicted by arrow 98 in FIG. 7c) in the case of oil failure. The air in the first circuit through the 4 structurally dedicated spokes 26b will not be contaminated by the air flowing through the top and bottom spoke housing the service lines 50 in the event of oil leakage.

The use of the 4 structurally dedicated spokes 26b to feed secondary cooling air from the cavity 40 to the cavity disc of the upstream rotor also contributes to reduce the number of pipes and tubes. Indeed, the spokes are used as air feed tubes to direct cooling air to adjacent turbine components, thereby reducing the number of parts to be installed on the engine.

The above description is meant to be exemplary only, and one skilled in the art will recognize that changes may be made to the embodiments described without departing from the scope of the invention disclosed. Any modifications which fall within the scope of the present invention will be apparent to those skilled in the art, in light of a review of this disclosure, and such modifications are intended to fall within the appended claims.

The invention claimed is:

1. A casing assembly for a gas turbine engine, the casing assembly comprising an engine outer case, a mid-turbine frame housed in the engine outer case extending circumferentially about a central axis, the mid-turbine frame including: an outer structural ring disposed concentric to the central axis, an annular air plenum defined radially between a radially inner surface of the engine outer case and a radially outer surface of the outer structural ring, the annular air plenum encircling the outer structural ring, an intake duct having an inlet adapted to be fluidly connected to a source of cooling air and a pair of outlets oriented to discharge cooling air in the annular air plenum with a radially outward and a circumferential component, an inner structural ring disposed concentric to the central axis, an annular gas path between the inner and outer structural ring, a plurality of circumferentially spaced-apart hollow struts extending radially through the gas path, a plurality of circumferentially spaced-apart tubular spokes respectively extending internally through the hollow struts and structurally directly interconnecting the inner structural ring to the outer structural ring, the plurality of circumferentially spaced-apart struts directly attached to the outer structural ring, the plurality of circumferentially spaced-apart tubular spokes transferring loads from the inner structural ring to the outer structural ring independently of the engine outer case, the tubular spokes defining coolant flow passages extending generally radially across the gas path, the tubular spokes arranged and fluidly connected in first and second groups respectively forming parallel first and second cooling circuits, wherein the first cooling circuit is in fluid flow communication with a disc cavity of a turbine disc and the second cooling circuit is in fluid flow communication with an oil scupper line, wherein the plurality of circumferentially spaced-apart tubular spokes are connected in flow communication to a common source of coolant, the common source of coolant including the annular air plenum surrounding the outer structural ring, the annular air plenum conveying cooling air to the the plurality of circumferentially spaced-apart struts in a circumferential manner around the outer structural ring.

2. The mid-turbine frame defined in claim 1, wherein each of the tubular spokes of the second group houses a respective oil service line.

3. The mid-turbine frame defined in claim 1, wherein the first cooling circuit comprises the annular air plenum disposed radially outwardly of the gas path, and a first annular chamber disposed radially inwardly of the gas path, the annular air plenum being connected in fluid flow communication with the first annular chamber via at least some of the tubular spokes of the first group.

4. The mid-turbine frame defined in claim 3, wherein the second cooling circuit comprises the annular air plenum disposed radially outwardly of the gas path, and a second annular chamber disposed radially inwardly of the gas path, the annular plenum being connected to the second annular chamber by a first one of the tubular spokes of the second group of tubular spokes, and wherein a second one of the tubular spokes of the second group of tubular spokes has an inlet provided at a radially inner end thereof, the inlet being connected in fluid flow communication with the second annular chamber, and wherein the second one of the tubular spokes of the second group of tubular spokes has an outlet at a radially outer end thereof for communicating cooling air received from the second annular chamber radially outwardly of the gas path to the oil scupper line.

5. The mid-turbine frame defined in claim 4, wherein the first and second tubular spokes of the second group of tubular spokes houses oil service lines.

6. The mid-turbine frame defined in claim 5, wherein the first and second tubular spokes of the second group of tubular spokes are diametrically opposed to one another.

7. The mid-turbine frame defined in claim 1, wherein the second group of tubular spokes comprises first and second tubular spokes serially connected in fluid flow relationship via an annular chamber disposed radially inwardly of the gas path.

8. The mid-turbine frame defined in claim 7, wherein the first tubular spoke of the second group has an inlet at a radially outer end thereof connected to the common source of coolant disposed radially outwardly of the gas path, and an outlet at a radially inner end thereof connected in fluid flow communication with the annular chamber.

9. The mid-turbine frame defined in claim 1, wherein at least some of the tubular spokes of the first group of tubular spokes are arranged in parallel fluid flow relationship for feeding a first annular chamber, and wherein at least some of the tubular spokes of the second group of tubular spokes are serially connected in fluid flow communication via a second annular chamber, the first and second annular chambers being separate from one another.

10. The mid-turbine frame defined in claim 9, wherein the tubular spokes of the first group of tubular spokes each have a reverse flow passage configured to re-direct a portion of a coolant flow discharged radially inwardly from the coolant flow passages back into the tubular spokes of the first group of tubular spokes in a radially outward direction.

11. A spoke cooling arrangement for a gas turbine engine mid-turbine frame module housed in an engine outer case extending circumferentially about a central axis, the gas turbine engine mid-turbine frame module comprising: a plurality of circumferentially spaced-apart tubular spokes structurally interconnecting an inner structural ring to an outer structural ring disposed concentric to the central axis, the plurality of circumferentially spaced-apart tubular spokes directly connected to the outer structural ring and defining a load path to transfer loads from the inner structural ring to the outer structural ring independently of the engine outer case, the outer structural ring and the engine outer case defining an annular air plenum radially therebetween, the annular air plenum encircling the outer structural ring and fluidly connected to a duct having a pair of outlets oriented to discharge cooling air with a radially outward and a circumferential component, the spoke cooling arrangement comprising: first and second separate cooling circuits connected to the annular air plenum, the first cooling circuit including a first group of the tubular spokes arranged in parallel fluid flow relationship and fluidly linking the annular air plenum to a disc cavity of a turbine disc, the second cooling circuit including a second group of the tubular spokes arranged in serial fluid flow relationship and fluidly linking the annular air plenum to an oil scupper line.

12. The spoke cooling arrangement defined in claim 11, wherein the tubular spokes of the second group each house a respective oil service line.

13. The spoke cooling arrangement defined in claim 11, wherein the first cooling circuit comprises an annular chamber in fluid flow communication with a radially inner end of the tubular spokes of the first group, the annular air plenum being connected in fluid flow communication to the annular chamber via at least some of the tubular spokes of the first group.

14. The spoke cooling arrangement defined in claim 13, wherein the tubular spokes of the first group of tubular spokes each have a reverse flow passage configured to re-direct a portion of a coolant flow directed into the annular chamber back into the tubular spokes of the first group in a radially outward direction.

15. The spoke cooling arrangement defined in claim 11, wherein the second cooling circuit comprises an annular chamber disposed radially inwardly of the inner structural ring, the annular air plenum being connected to the annular chamber by a first one of the tubular spokes of the second group of tubular spokes, and wherein a second one of the tubular spokes of the second group of tubular spokes has an inlet provided at a radially inner end thereof, the inlet being connected in fluid flow communication with the annular chamber, and wherein the second one of the tubular spokes of the second group of tubular spokes has an outlet at a radially outer end thereof.

16. The spoke cooling arrangement defined in claim 11, wherein a gas path is defined between the outer and inner structural rings, wherein hollow struts shield respective ones of the tubular spokes from the gas path, and wherein at least one of the hollow struts house both one of the tubular spokes and a service line.

17. The spoke cooling arrangement defined in claim 16, wherein the second cooling circuit comprises an annular coolant passage between the service line and the one of the tubular spokes of the second group.

* * * * *